United States Patent
Ishiguro

(10) Patent No.: US 7,679,856 B2
(45) Date of Patent: Mar. 16, 2010

(54) STORAGE DEVICE, CONTROL DEVICE, AND VIBRATION-DETECTION METHOD

(75) Inventor: Takehiro Ishiguro, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/023,476

(22) Filed: Jan. 31, 2008

(65) Prior Publication Data

US 2008/0225428 A1 Sep. 18, 2008

(30) Foreign Application Priority Data

Mar. 14, 2007 (JP) ............................. 2007-065739

(51) Int. Cl.
*G11B 21/02* (2006.01)

(52) U.S. Cl. ...................................... 360/75

(58) Field of Classification Search ................... 360/75, 360/51, 77.13, 77.02, 78.05, 73.03, 77.06, 360/77.08, 77.09, 46, 60; 700/79; 310/328
See application file for complete search history.

(56) References Cited

U.S. PATENT DOCUMENTS

| 5,325,247 A * | 6/1994 | Ehrlich et al. ............. 360/78.09 |
| 5,384,676 A * | 1/1995 | Yokoyama et al. ....... 360/77.13 |
| 5,438,872 A * | 8/1995 | Kobayashi et al. ............. 73/597 |
| 5,903,408 A * | 5/1999 | Omi ......................... 360/73.03 |
| 6,166,874 A | 12/2000 | Kim |
| 6,246,156 B1 * | 6/2001 | Takeuchi et al. ............. 310/328 |
| 6,407,876 B1 | 6/2002 | Yamaguchi et al. |
| 6,415,189 B1 * | 7/2002 | Hajji ........................... 700/79 |
| 6,771,455 B1 * | 8/2004 | Yatsu ....................... 360/77.06 |
| 6,833,974 B2 * | 12/2004 | Koso et al. ................ 360/78.05 |
| 7,035,037 B2 * | 4/2006 | Tao et al. .................. 360/77.02 |
| 7,046,478 B2 * | 5/2006 | Zhang et al. ............. 360/77.08 |
| 7,193,799 B2 * | 3/2007 | Chung ......................... 360/46 |
| 7,233,453 B2 * | 6/2007 | Harada et al. .................. 360/51 |
| 7,333,285 B2 | 2/2008 | Hyung-Joon |
| 7,450,333 B2 * | 11/2008 | Hirano et al. .................. 360/75 |
| 2003/0103287 A1 * | 6/2003 | Agematsu ..................... 360/60 |
| 2007/0295230 A1 * | 12/2007 | Christel et al. .............. 101/375 |

FOREIGN PATENT DOCUMENTS

| JP | 2004-063040 | 2/2004 |
| KR | 1999-012977 | 2/1999 |
| KR | 2002-90533 | 12/2002 |
| KR | 2005-0113523 | 12/2005 |
| WO | WO97/27588 A1 | 7/1997 |

* cited by examiner

*Primary Examiner*—Fred Tzeng
(74) *Attorney, Agent, or Firm*—Greer, Burns & Crain, Ltd.

(57) ABSTRACT

A storage device positions a head at a predetermined position on a storage medium by driving an actuator with the head and at least writes data onto the storage medium. The storage device includes a vibration sensor, a filter for outputting a signal of a frequency band centered on a first frequency from an output of the vibration sensor, and a write-protection-determination unit for protecting against data-writing processing upon a value of the output of the filter being larger than a threshold value.

7 Claims, 4 Drawing Sheets

STORAGE DEVICE, CONTROL DEVICE, AND VIBRATION-DETECTION METHOD

BACKGROUND

1. Field

The present technique relates to a storage device, a control device, and a vibration-detection method that are configured to protect an adjacent track of a magnetic disk from data writing which occurs due to vibrations created by an actuator.

2. Description of the Related Art

A magnetic-storage device writes data onto and read data from a magnetic disk by using a magnetic head.

Then, the magnetic head should be positioned on a predetermined track provided on the magnetic disk, so as to write data onto and read data from the magnetic disk. Therefore, servo information is recorded in advance in a servo sector provided between data sectors provided on the track by using a servo-track writer or the like. When writing data onto and reading data from the magnetic disk, the magnetic head is moved to the position of a target track based on information about the current position. Next, the magnetic head is positioned on the target track based on information about the servo sector, the information being read by the magnetic head. After that, feedback control is performed so that the magnetic head is positioned at the center of the track while data is written onto or read from the data sector.

Thus, the magnetic head is subjected to the positioning control. When the amount of off-tracks detected by reading the servo information exceeds a threshold value, the magnetic head usually stops performing the write operation. However, since the servo information is a discrete signal obtained for each of servo sectors, it is difficult to detect the off-track amount when the magnetic head exists between the servo sectors, that is to say, when the magnetic head is positioned in the data sector. Therefore, methods performed by using a sensor signal have been proposed. For example, according to a method disclosed in WO97/27588, an accelerometer is installed on a magnetic head and/or a carriage supporting the magnetic head, and a signal transmitted from the accelerometer is fed back so that the magnetic head is positioned.

According to the above-described method disclosed in WO97/27588, a sensor is installed on the magnetic head and/or the carriage, and the sensor signal is fed back so that the magnetic head is positioned. In actuality, however, it is difficult to position the magnetic head by using the signal of the sensor alone. Therefore, control is usually performed so that a correct off-track amount is detected by reading a servo signal and the magnetic head is positioned on a target track.

However, if the component of a residual vibration created by head positioning is an integral multiple of a Nyquist frequency which is a half of a sampling frequency of the servo sector, for example, when the magnetic head is positioned on the target track by performing seek control, the magnetic head may be off the track in the data sector even though the magnetic head is on the target track in the servo sector, and there is no means configured to detect the off-track occurring in the data sector when the magnetic head is in the above-described vibration state. Namely, when trying to detect the off-track amount by using the servo signal at the time where the magnetic head vibrates with a frequency component which is an integral multiple of the Nyquist frequency, it is difficult to detect an actual off-track amount. This is because the vibration cycle of the magnetic head is synchronized with a cycle in which the servo sector passes the magnetic head 2.

Further, according to another method, a shock sensor is used for an external shock so that operations are stopped when the shock is exerted. However, a vibration which will be discussed is a small residual vibration which occurs immediately after the magnetic head is positioned on the target track by performing the seek control. Since an ordinary shock sensor is configured to detect a vibration with a large amplitude, it is basically difficult for the ordinary shock sensor to detect the small residual vibration. Further, even though the sensitivity of the shock sensor is simply increased, so as to detect the small residual vibration, a small external vibration and/or an insignificant residual vibration is erroneously detected, as an off-track, so that the write operation is stopped frequently. Subsequently, the performance of the magnetic head is significantly decreased.

Further, the off-track margin becomes increasingly smaller as the density of track pitches of the magnetic disk becomes increasingly higher, which makes it difficult to ignore any vibration irrespective of how small it is.

SUMMARY

Accordingly, an object of the present technique is to provide a storage device that are configured to detect a vibration including a specified frequency component, and protect an adjacent track from data writing.

According to an embodiment, a storage device positions a head at a predetermined position on a storage medium by driving an actuator with the head, and at least writes data onto the storage medium. The storage device includes a vibration sensor, a filter for outputting a signal of a frequency band centered on a first frequency from an output of the vibration sensor, and a write-protection-determination unit for protecting against data-writing processing upon a value of the output of the filter being larger than a threshold value.

According to the above-described configuration, it becomes possible to detect only a vibration including a specified frequency-band component and protect against data writing when the amplitude value of the vibration is larger than the threshold value. As a result, it becomes possible to protect an adjacent track from data writing caused by a residual vibration created by seek control.

DESCRIPTION OF THE PREFERRED EMBODIMENTS

Figure 1:
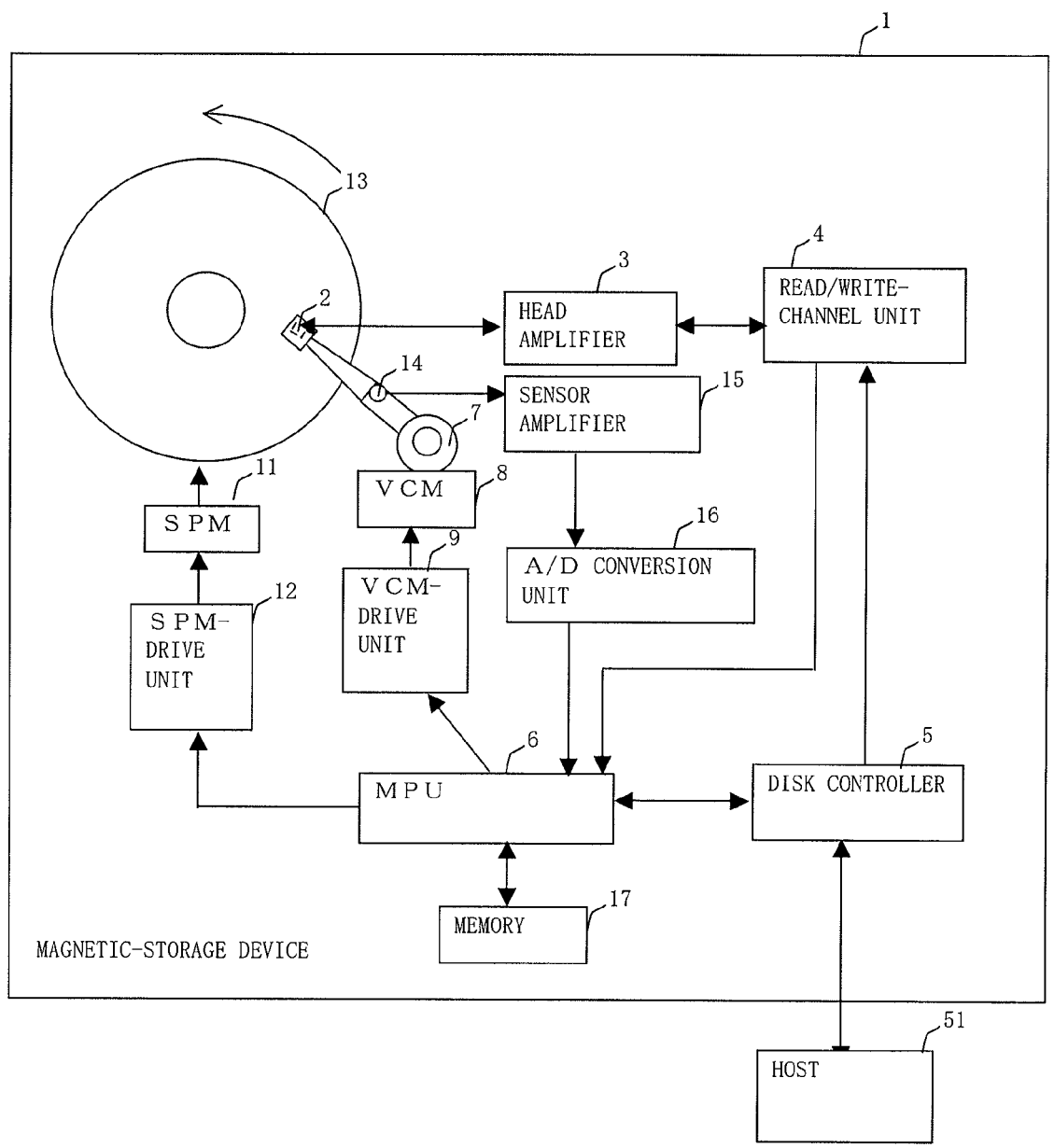
FIG. 1 shows the configuration of a magnetic-storage device.

FIG. 1 shows the configuration of a magnetic-storage device which is an example storage device. The magnetic-storage device 1 includes a magnetic head 2, a head amplifier 3, a read/write-channel unit 4, a disk controller 5, a micro processing unit (MPU) 6, an actuator 7, a voice coil motor 8 (hereinafter referred to as a VCM 8), a VCM-drive unit 9, a spindle motor 11 (hereinafter referred to as an SPM 11), an SPM-drive unit 12, a magnetic disk 13, a vibration sensor 14, a sensor amplifier 15, an analog-to-digital (A/D) conversion unit 16, and a memory 17.

The magnetic head 2 writes data onto and read data from the magnetic disk 13. Therefore, the magnetic head 2 includes a write head and a read head that are provided in proximity to each other.

The head amplifier 3 includes a read amplifier and a write amplifier. The read amplifier performs voltage conversion for a signal transmitted from the read head of the magnetic head 2 so that a read signal is generated, and transmits the read signal to the read/write-channel unit 4. The write amplifier drives the write head of the magnetic head 2 according to a write signal transmitted from the read/write-channel unit 4.

The read/write-channel unit 4 demodulates the read signal transmitted from the head amplifier 3, and transmits the demodulated read signal to the disk controller 6. Further, the read/write-channel unit 4 generates a servo signal and transmits the generated servo signal to the MPU 6. Further, the read/write-channel unit 4 generates a write signal that should be transmitted to the magnetic disk 13 by modulating a write-data signal transmitted from the disk controller 5, so as to write the write-data signal onto the magnetic disk 13, and transmits the generated write signal to the head amplifier 3.

The disk controller 5 receives a write command and/or a read command transmitted from a host 51. Then, if data should be written onto the magnetic disk 13, the disk controller 5 transmits write data to the read/write-channel unit 4. On the contrary, if data should be read from the magnetic disk 13, the disk controller 5 transmits read data transmitted from the read/write-channel unit 4 to the host 51. The MPU 6 performs vibration-detection processing and servo control, controls writing data onto and reading data from the magnetic disk 13, and so forth. Namely, the MPU 6 is a control device configured to control the entire magnetic-storage device 1. The magnetic head 2 and the vibration sensor 14 are mounted onto the actuator 7, which is driven by the VCM 8.

The VCM 8, which is a voice coil motor, drives the actuator 7, so as to position the magnetic head 2 at a position on the magnetic disk 13, where the position is specified by the MPU 6. The VCM-drive unit 9 drives the VCM 8 according to a drive signal transmitted from the MPU 6. The SPM 11, which is a spindle motor, rotates the magnetic disk 13. The SPM-drive unit 12 drives the SPM 11 according to the drive signal transmitted from the MPU 6. A servo signal, user data, etc. that are used to position the magnetic head 2 are recorded onto the magnetic disk 13.

The vibration sensor 14 is attached to an operation unit such as an arm of the actuator 7, so as to detect a small vibration including a seeking-residual vibration, for example. The vibration sensor 14 used in the above-described embodiment is a piezoelectric element, for example. An output signal transmitted from the vibration sensor 14 is converted into digital data by using the A/D-conversion unit 16 via the sensor amplifier 15. Here, a sampling frequency subjected to the A/D conversion is a frequency that can be filtered. Namely, the sampling frequency is at least twice as high as a servo-sampling frequency. The sensor amplifier 15 amplifies the output signal transmitted from the vibration sensor 14. The A/D-conversion unit 16 converts an output signal transmitted from the sensor amplifier 15 into digital data. Data on a threshold value compared to the value of an output signal transmitted from a digital filter 31 that will be described later is stored in the memory 17.

Figure 2:
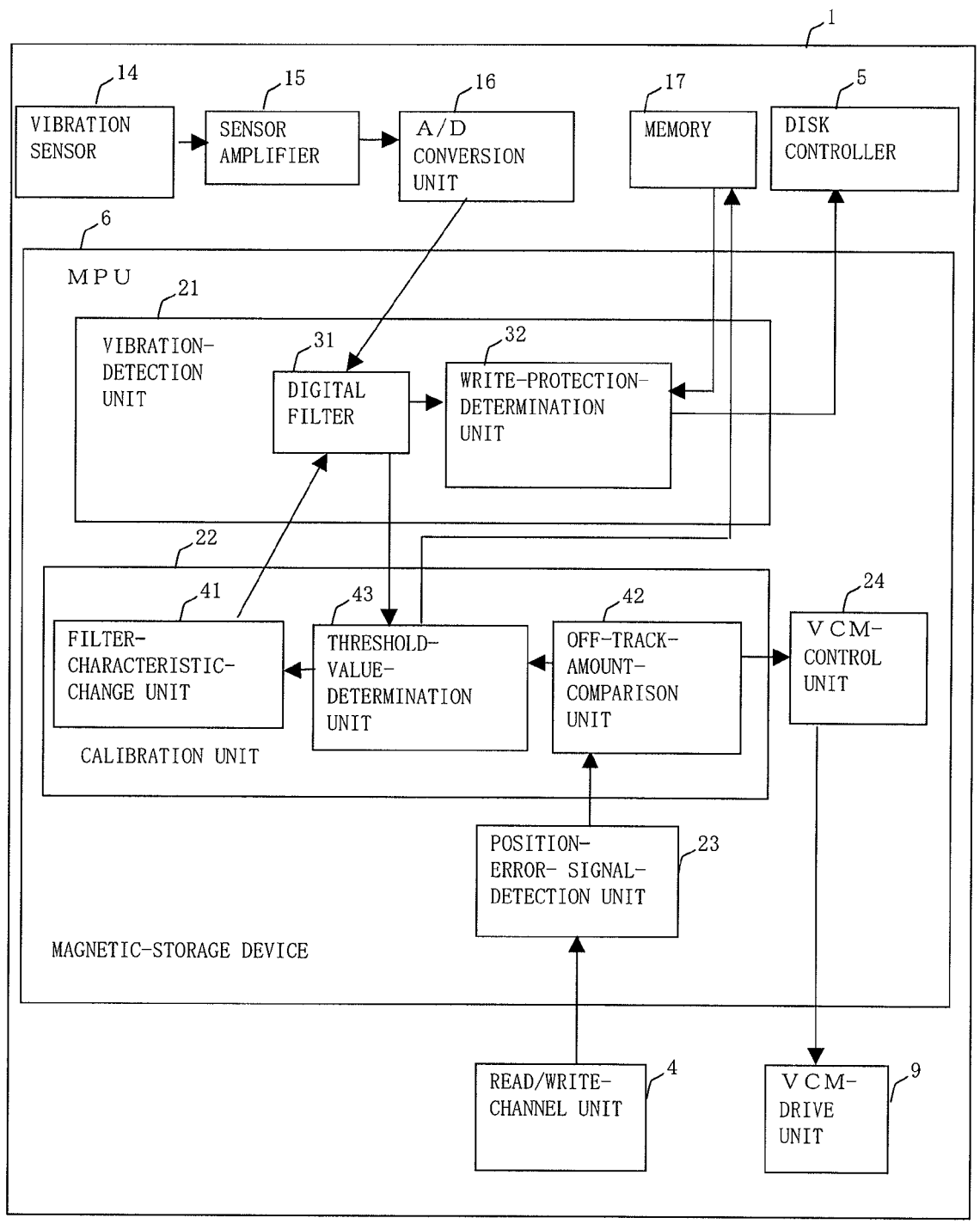
FIG. 2 illustrates vibration-detection processing.

FIG. 2 illustrates the vibration-detection processing.

The vibration-detection processing performed by the MPU 6 will be described.

The vibration-detection processing performed by the MPU 6 is performed by using a vibration-detection unit 21, a calibration unit 22, a position-error-signal-detection unit 23, and a VCM-control unit 24.

The vibration-detection unit 21 includes the digital filter 31 and a write-protection-determination unit 32. The digital filter 31 is a band-pass filter configured to pass frequencies of a band centered on a specified frequency once as high as a Nyquist frequency, where one of the limits of the band is higher than the specified frequency by as much as 10 percent of the specified frequency and the other limit is lower than the specified frequency by as much as 10 percent of the specified frequency. The digital filter 31 is also configured to pass frequencies of a band centered on a specified frequency twice as high as the Nyquist frequency, where one of the limits of the band is higher than the specified frequency by as much as 10 percent of the specified frequency and the other limit is lower than the specified frequency by as much as 10 percent of the specified frequency. The digital filter 31 is also configured to pass frequencies of a band centered on a specified frequency three times as high as the Nyquist frequency, where one of the limits of the band is higher than the specified frequency by as much as 10 percent of the specified frequency and the other limit is lower than the specified frequency by as much as 10 percent of the specified frequency. The Nyquist frequency is a half of the sampling frequency of the servo signal. When the revolution number is determined to be 4200 rpm and the number of servo sectors per a single track is determined to be 60, the sampling frequency is determined to be 4.2 kHz. Therefore, the Nyquist frequency is 2.1 kHz, so that the frequency which is once as high as the Nyquist frequency is 2.1 kHz, the frequency which is twice as high as the Nyquist frequency is 4.2 kHz, and the frequency which is three times as high as the Nyquist frequency is 6.3 kHz. The digital data transmitted from the A/D-conversion unit 16 is filtered. Although the digital filter 31 is used in the above-described embodiment, the same result as that obtained by using the digital filter 31 can be obtained by using an analog filter.

The write-protection-determination unit 32 determines whether or not the value of each of signals of frequency components centered on a predetermined frequency that had passed the digital filter 31 is equivalent to a predetermined threshold value or more. Therefore, the write-protection-determination unit 32 reads the output value of the digital filter 31 and the threshold value of the memory 17, and compares the read output value to the read threshold value. Then, when the output value of the digital filter 31 is equivalent to the threshold value or more, the write-protection-determination unit 32 outputs a write-protection signal. Further, when the output value of the digital filter 31 is smaller than the threshold value, the write-protection-determination unit 32 does not output the write-protection signal and determines that data can be written. The above-described threshold value is calculated in advance through calibration.

The calibration unit 22 includes a filter-characteristic-change unit 41, an off-track-amount-comparison unit 42, and a threshold-value-determination unit 43. The calibration is performed at the time where the power is turned on, the number of times a write error occurs becomes higher than a predetermined number, etc.

When performing the calibration, the filter-characteristic-change unit 41 shifts frequency bands of the digital filter 31 to frequency band out of the frequency band centered on the specified frequency once as high as the Nyquist frequency, where one of the limits of the frequency band is higher than the specified frequency by as much as 10 percent of the specified frequency and the other limit is lower than the specified frequency by as much as 10 percent of the specified frequency. Further, the filter-characteristic-change unit 41 shifts frequency bands of the digital filter 31 to frequency band out of the frequency band centered on the specified frequency twice as high as the Nyquist frequency, where one of the limits of the frequency band is higher than the specified frequency by as much as 10 percent of the specified frequency and the other limit is lower than the specified frequency by as much as 10 percent of the specified frequency. Further, the filter-characteristic-change unit 41 shifts frequency bands of the digital filter 31 to frequency band out of the frequency band centered on the specified frequency three times as high as the Nyquist frequency, where one of the limits of the frequency band is higher than the specified frequency by as much as 10 percent of the specified frequency and the other limit is lower than the specified frequency by as much as 10 percent of the specified frequency. After the threshold value is determined, the filter-characteristic-change unit 41 resets frequency bands of the digital filter 31 to the frequency band centered on the specified frequency once as high as the Nyquist frequency, where one of the limits of the frequency band is higher than the specified frequency by as much as 10 percent of the specified frequency and the other limit is lower than the specified frequency by as much as 10 percent of the specified frequency. Further, the filter-characteristic-change unit 41 resets frequency bands of the digital filter 31 to the frequency band centered on the specified frequency twice as high as the Nyquist frequency, where one of the limits of the frequency band is higher than the specified frequency by as much as 10 percent of the specified frequency and the other limit is lower than the specified frequency by as much as 10 percent of the specified frequency. Further, the filter-characteristic-change unit 41 resets frequency bands of the digital filter 31 to the frequency band centered on the specified frequency three times as high as the Nyquist frequency, where one of the limits of the frequency band is higher than the specified frequency by as much as 10 percent of the specified frequency and the other limit is lower than the specified frequency by as much as 10 percent of the specified frequency.

The off-track-amount-comparison unit 42 transmits an instruction to the VCM-control unit 24 so that the VCM 8 is driven at the same frequency as that determined by the filter-characteristic-change unit 41. Further, the off-track-amount-comparison unit 42 compares off-track-amount data obtained from the position-error-signal-detection unit 23 to a predetermined value. Then, the off-track-amount-comparison unit 42 transmits data on the comparison result to each of the threshold-value-determination unit 43 and the VCM-control unit 24. The predetermined value is an off-track amount that had already been obtained. When the above-described off-track amount is obtained, write protection is performed. When the off-track amount is equivalent to the predetermined value, the threshold-value-determination unit 43 determines the output value of the digital filter 31 to be the threshold value, and stores data on the threshold value in the memory 17.

The position-error-signal-detection unit 23 acquires off-track-amount data obtained from the servo signal from the read/write-channel unit 4 and transmits the acquired off-track-amount data to the off-track-amount-comparison unit 42.

The VCM-control unit 24 controls the VCM-drive unit 9. When calibration processing is performed, the VCM-drive unit 9 is controlled at a frequency determined by the filter-characteristic-change unit 41. Then, when the off-track amount is larger than the predetermined value, the VCM-control unit 24 performs control so that the operation amount of the VCM 8 is reduced. On the contrary, when the off-track amount is smaller than the predetermined value, the VCM-control unit 24 performs control so that the operation amount of the VCM 8 is increased. Subsequently, the off-track amount is adjusted, so as to be equivalent to the predetermined value.

The general outlines of the vibration-detection processing will be described. When the magnetic head 2 is vibrated with a frequency component which is an integral multiple of the Nyquist frequency, it is difficult to detect the actual off-track amount by using the servo signal. This is because the vibration cycle of the magnetic head 2 is synchronized with the cycle in which the servo sector passes the magnetic head 2. Therefore, if the value of a frequency component which is an integral multiple of the Nyquist frequency output from an output of the vibration sensor 14 is equivalent to the threshold value or more, the write protection should be performed. This is because data recorded on the adjacent tracks may be corrupted.

Figure 3:
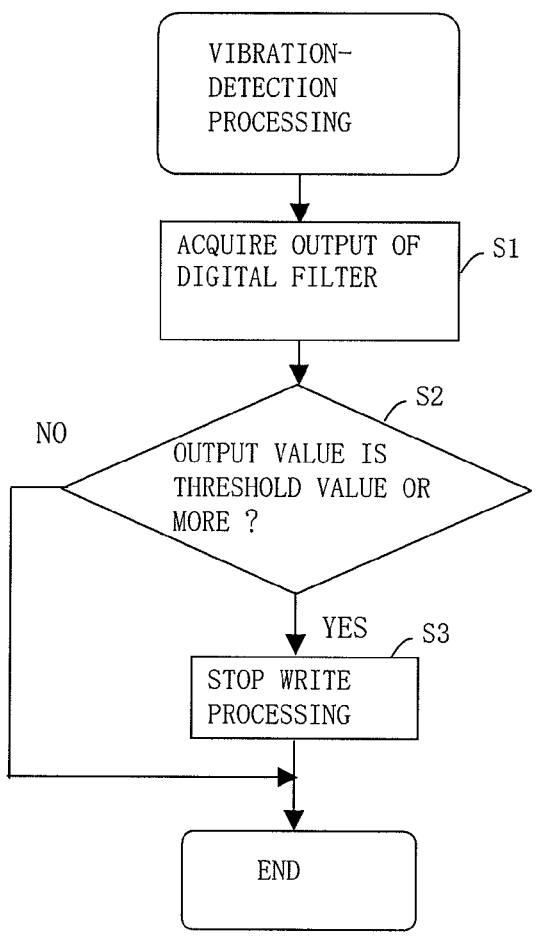
FIG. 3 is a flowchart of the vibration-detection processing.

FIG. 3 is a flowchart of the vibration-detection processing. When write processing is performed, a seek operation is performed so that the magnetic head 2 is moved to a predetermined track, and the magnetic head 2 reads a servo sector. Subsequently, data on the track position and servo information are acquired. Next, positioning processing is performed. The vibration-detection processing is performed when the positioning processing is performed. First, a vibration created by the seek operation is detected by the vibration sensor 14 mounted on the actuator 7. An output of the detected vibration is converted into digital data through the A/D-conversion unit 16 via the sensor amplifier 15. After that, the digital data is transmitted to the MPU 6, and the digital filter 31, which is a band-pass filter. This filter transmits only frequency-band widths which is integral multiples of the Nyquist frequency. The output of the digital filter 31 is transmitted to the write-protection-determination unit 32. The write-protection-determination unit 32 acquires the output that passed through the digital filter 31. Then, the write-protection-determination unit 32 detects whether or not the output value is equivalent to the threshold value or more, at step S2.

Figure 4:
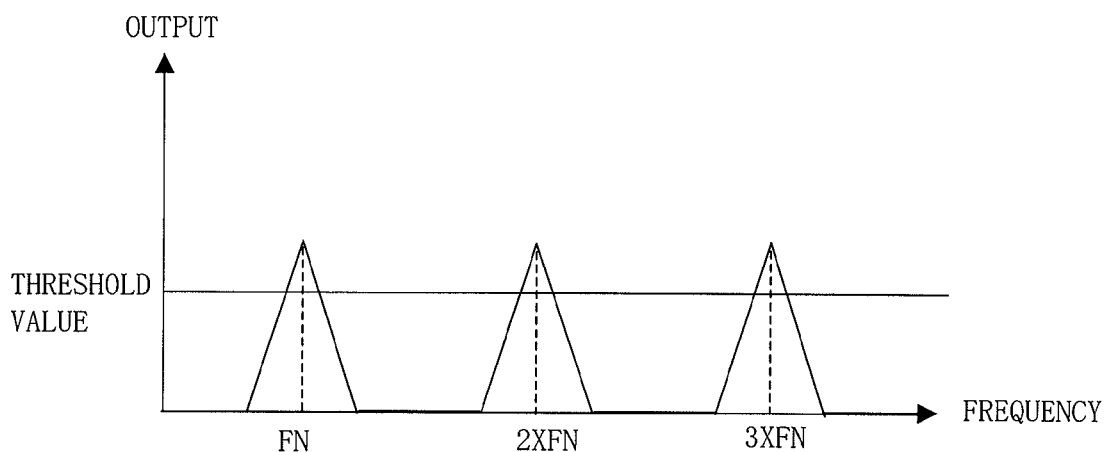
FIG. 4 illustrates outputs of a digital filter.

FIG. 4 illustrates the outputs of the digital filter 31. The vibration of each of frequencies that are once, twice, and three times as high as a Nyquist frequency FN passes through the digital filter 31 and each of the output values of the digital filter 31 is larger than the threshold value. In that case, the write-protection-determination unit 32 outputs a write-protection signal.

Returning to FIG. 3, when the value of the output of the digital filter 31 is equivalent to the threshold value or more, the MPU 6 stops performing the write processing and waits until the vibration value is equivalent to the threshold value or less, at step S3. If the value of the output that passed through the digital filter 31 is equivalent to the threshold value or less, the MPU 6 terminates the vibration-detection processing. Further, when the output value is equivalent to the threshold value or less, the MPU 6 positions the magnetic head 2 based on a position-error calculation and performs data writing.

Next, the general outlines of calibration operations will be described. The write protection is performed when the off-track amount of the magnetic head 2 is equivalent to the threshold value or more. The threshold value of the write protection is determined in the following manner.

According to the above-described method, a vibration consisted of frequency component which is not an integral multiple of the Nyquist frequency is given to the actuator 7, and an output of the vibration sensor 14 is transmitted to the digital filter 31, the output being obtained when the vibration is given to the actuator 7. When the calibration operations are performed, the filter-characteristic-change unit 41 sets the band of a frequency output from the digital filter 31 to that of the same frequency as the frequency which vibrated the actuator 7. Then, the relationship between the output of the digital filter 31, the output being obtained at that time, and the off-track amount of the magnetic head 2 is obtained. The above-described off-track amount is a position error calculated based on the servo information. Then, the amplitude of the frequency transmitted to the actuator 7 is gradually increased, and the value of an output of the digital filter 31, the output being obtained when an off-track occurs, that is to say, when the magnetic head 2 is moved to a position protected from data writing, is acquired. After the calibration operations are finished, the filter-characteristic-change unit 41 determines the band of a frequency output from the digital filter 31 to be an integral multiple of the Nyquist frequency. Subsequently, the value of an output of the digital filter 31 can be determined to be the threshold value, where the output is obtained when an off-track of the magnetic head 2 occurs due to a vibration, namely, when the magnetic head 2 is moved to a position protected from data writing. Next, the calibration operations will be specifically described.

Figure 5:
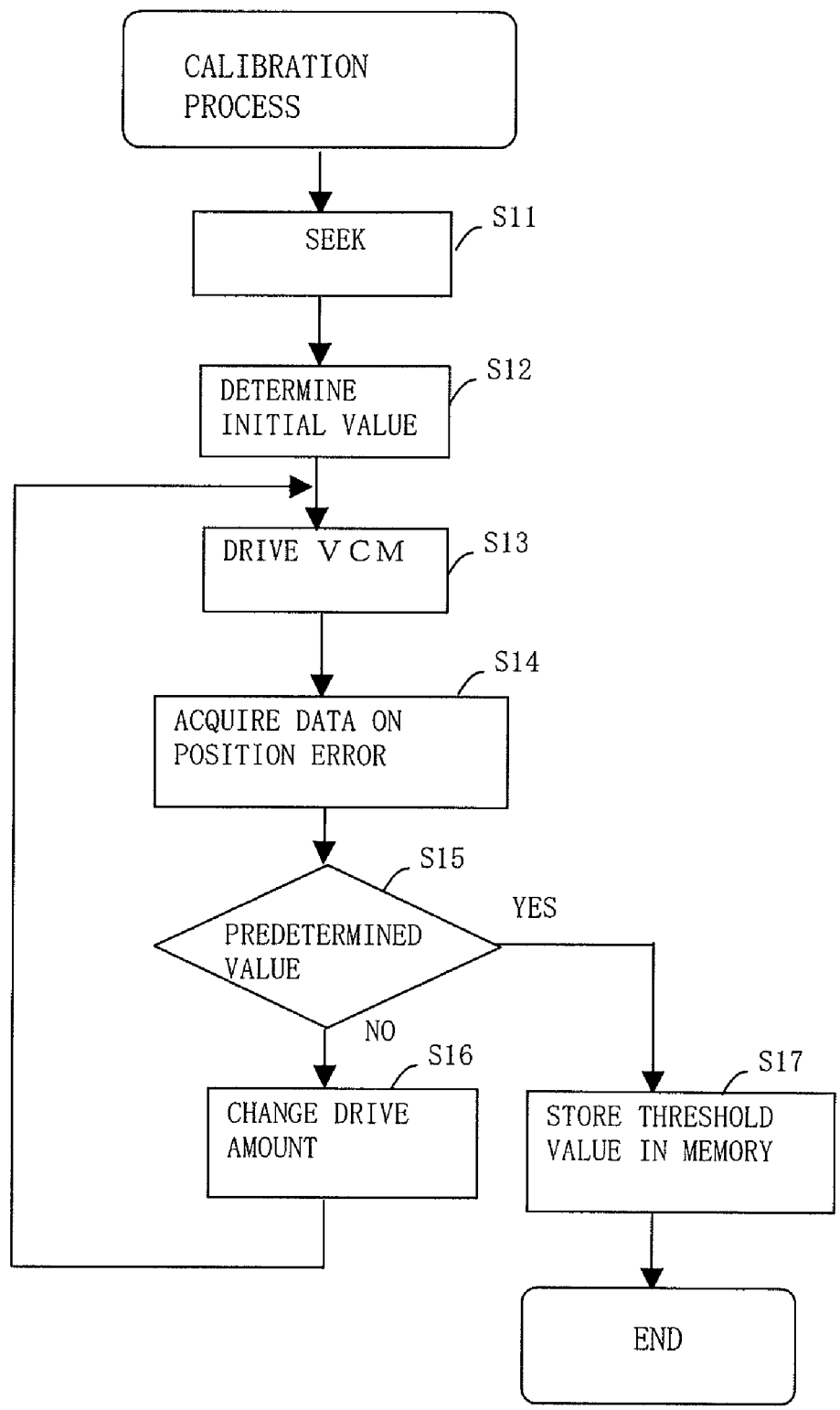
FIG. 5 is a flowchart of calibration process.

FIG. 5 is a flowchart of calibration process. The calibration process is performed by using the vibration-detection unit 21 and the calibration unit 22. First, the seek operation is performed so that the magnetic head 2 is moved to a predetermined track, at step S11. Next, an initial value is determined, at step S12. The coefficient of the digital filter 31 is determined to be specified frequency A other than an integral multiple of the Nyquist frequency. Further, the VCM-control unit 24 determines the frequency A at which the VCM 8 is driven and the initial value of the amplitude of the frequency A.

Next, the VCM-control unit 24 drives the VCM 8 at the frequency A, at step S13. Next, the magnetic head 2 reads the servo information and acquires data on the position error based on a burst pattern, at step S14.

Next, it is checked whether or not the value of the position error acquired based on the servo information is equivalent to a predetermined value, at step S15. If the position-error value acquired based on the servo information is smaller than the predetermined value, the VCM-control unit 24 increases the drive amount, and the process returns to step S13. If the position-error value acquired based on the servo information is larger than the predetermined value, the VCM-control unit 24 decreases the drive amount, and the process returns to step S13, at step S16.

Next, when the off-track-amount data obtained based on the servo information is equivalent to a predetermined value, the value of an output of the digital filter 31 is acquired. Then, the output value is stored in the memory 17, as the threshold value, at step S17.

Thus, since only the specified frequency is extracted and compared to the threshold value, it becomes possible to detect an off-track which is not detected by using the shock sensor and/or servo information. Subsequently, an adjacent track can be protected from unintended data writing. Further, since the threshold value can be calculated through the calibration, it becomes possible to adapt to a change in the characteristics of a device automatically, such as aging of the magnetic-storage device 1. Further, the same effect as that achieved in the above-described embodiment can be obtained by using an existing threshold value given at the shipment time instead of using the threshold value obtained through the calibration according to the above-described embodiment. Further, the same effect as that achieved in the above-described embodiment can be obtained by performing a method of determining the threshold value by calculating the relationship between the off-track-amount data obtained from the servo information obtained by the operation amount of the actuator 7 and the output value of the digital filter 31 instead of gradually increasing and/or decreasing the amount of driving the actuator 7.

What is claimed is:

1. A control device used for a storage device for positioning at a predetermined position on a storage medium by driving an actuator with both a head and a vibration sensor, and at least for writing data onto the storage medium, the control device comprising:

a filter for outputting a signal of a frequency band centered on a first frequency from an output of the vibration sensor; and a write-protection-determination unit for protecting against data-writing processing upon a value of the output of the filter being larger than a threshold value, wherein the first frequency is a frequency which is an integral multiple of a Nyquist frequency which is a half of a sampling frequency of servo information which is written onto the storage medium in advance.

2. A storage device for positioning a head at a predetermined position on a storage medium by driving an actuator with the head, and at least for writing data onto the storage medium, the storage device comprising:

a vibration sensor; and the control device of claim 1.

3. A control device used for a storage device for positioning at a predetermined position on a storage medium by driving an actuator with both a head and a vibration sensor, and at least for writing data onto the storage medium, the control device comprising:

a filter for outputting a signal of a frequency band centered on a first frequency from an output of the vibration sensor;

a write-protection-determination unit for protecting against data-writing processing upon a value of the output of the filter being larger than a threshold value;

a position-error-signal-detection unit for detecting an amount of an off-track of the head; and a threshold-value-determination unit for determining the threshold value based on the off-track amount and a filter-output value when the actuator is driven at a second frequency.

4. A storage device for positioning a head at a predetermined position on a storage medium by driving an actuator with the head, and at least for writing data onto the storage medium, the storage device comprising:

a vibration sensor; and the control device of claim 3.

5. The storage device according to claim 3, further comprising a filter-characteristic-change unit for setting an output frequency of the filter to the second frequency other than the first frequency which is the integral multiple of the Nyquist frequency, and changing the output frequency of the filter from the second frequency to the first frequency upon the threshold-value-determination unit determining the threshold value.

6. The control device according to claim 3, further comprising a filter-characteristic-change unit for setting an output frequency of the filter to the second frequency other than the first frequency which is the integral multiple of the Nyquist frequency, and changing the output frequency of the filter from the second frequency to the first frequency upon the threshold-value-determination unit determining the threshold value.

7. A vibration-detection method used for a storage device configured to position a head at a predetermined position on a storage medium by driving an actuator with the head and at least to write data onto the storage medium, the method comprising the steps of:

acquiring an output of a filter configured to pass a first frequency from an output of a vibration sensor mounted on the actuator; and protecting against data writing upon a value of the output of the filter being larger than a threshold value, wherein the first frequency is a frequency which is an integral multiple of a Nyquist frequency which is a half of a sampling frequency of servo information which is written onto the storage medium in advance.

\* \* \* \* \*